United States Patent
Pedroza, III et al.

(10) Patent No.: US 10,542,169 B2
(45) Date of Patent: Jan. 21, 2020

(54) IMAGE FORMING APPARATUS TO ERASE HAND-WRITTEN IMAGES FROM IMAGE DATA

(71) Applicant: KYOCERA Document Solutions Inc., Osaka (JP)

(72) Inventors: Ramon Miko Gelu Pedroza, III, Osaka (JP); Dexie Jay Aljas, Osaka (JP); Louie Kert Basay, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/125,239

(22) Filed: Sep. 7, 2018

(65) Prior Publication Data

US 2019/0089858 A1    Mar. 21, 2019

(30) Foreign Application Priority Data

Sep. 20, 2017  (JP) .................. 2017-179967

(51) Int. Cl.
| *H04N 1/00* | (2006.01) |
| *H04N 1/10* | (2006.01) |
| *G06F 3/12* | (2006.01) |
| *H04N 1/047* | (2006.01) |

(52) U.S. Cl.
CPC ....... *H04N 1/00809* (2013.01); *G06F 3/1208* (2013.01); *G06F 3/1252* (2013.01); *H04N 1/00392* (2013.01); *H04N 1/0473* (2013.01); *H04N 1/1013* (2013.01); *H04N 1/1061* (2013.01)

(58) Field of Classification Search
CPC .................................................. H04N 1/00809
USPC .......................................................... 358/1.13
See application file for complete search history.

(56) References Cited

U.S. PATENT DOCUMENTS

| 2007/0188793 | A1* | 8/2007 | Wakai | G06K 9/00161 |
| | | | | 358/1.14 |
| 2011/0075199 | A1* | 3/2011 | Jung | H04N 1/00474 |
| | | | | 358/1.15 |
| 2018/0234577 | A1* | 8/2018 | Mizude | H04N 1/10 |
| 2018/0332183 | A1* | 11/2018 | Seki | H04N 1/00997 |

FOREIGN PATENT DOCUMENTS

JP    2014-30080 A    2/2014

* cited by examiner

*Primary Examiner* — Jacky X Zheng
(74) *Attorney, Agent, or Firm* — Stein IP, LLC

(57) ABSTRACT

The image forming apparatus includes an image reading section and a control section. The image reading section reads a document placed on a contact glass to generate image data. The control section decides whether or not the document is present at a specified position of the contact glass and, upon deciding that the document is present at the specified position, erases handwritten images from the image data of the document read by the image reading section.

6 Claims, 14 Drawing Sheets

IMAGE FORMING APPARATUS TO ERASE HAND-WRITTEN IMAGES FROM IMAGE DATA

INCORPORATION BY REFERENCE

This application is based upon and claims the benefit of priority from the corresponding Japanese Patent Application No. 2017-179967 filed on Sep. 20, 2017, the entire contents of which are incorporated herein by reference.

BACKGROUND

The present disclosure relates to an image forming apparatus for reading an original document to generate image data.

Conventionally, there is known a technique for erasing handwritten images from image data of an original document.

In execution of a job involving document reading (e.g., print job of printing, on paper sheets, images based on image data of a document), a conventional image forming apparatus accepts, from a user via an operation panel, whether or not handwritten images are to be erased. When the operation panel has accepted that handwritten images are to be erased, the conventional image forming apparatus performs a handwritten-image erasing process of erasing handwritten images from image data of the document obtained by the document reading.

SUMMARY

An image forming apparatus according to one aspect of the disclosure includes an image reading section and a control section. The image reading section reads a document placed on a contact glass to generate image data. The control section decides whether or not the document is present at a specified position of the contact glass, where upon deciding that the document is present at the specified position, the control section executes a handwritten-image erasing process of erasing handwritten images from the image data of the document read by the image reading section.

DETAILED DESCRIPTION

An image forming apparatus according to one embodiment of the disclosure will be described by taking as an example a multifunction peripheral on which a plurality of functions such as scan function and print function are installed.

<Configuration of Multifunction Peripheral>

Figure 1:
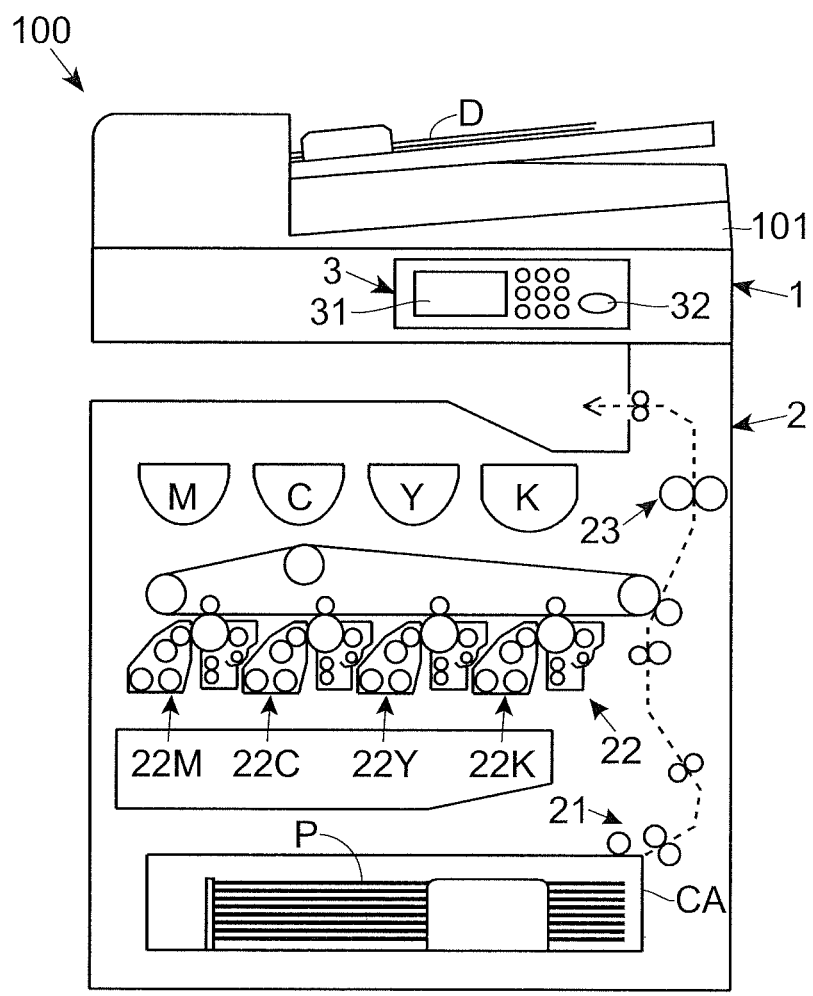
FIG. 1 is a schematic view showing a configuration of a multifunction peripheral according to one embodiment of this disclosure.

As shown in FIG. 1, a multifunction peripheral 100 of this embodiment includes an image reading section 1, a printing section 2, and an operation panel 3. The multifunction peripheral 100 corresponds to 'image forming apparatus.'

Figure 2:
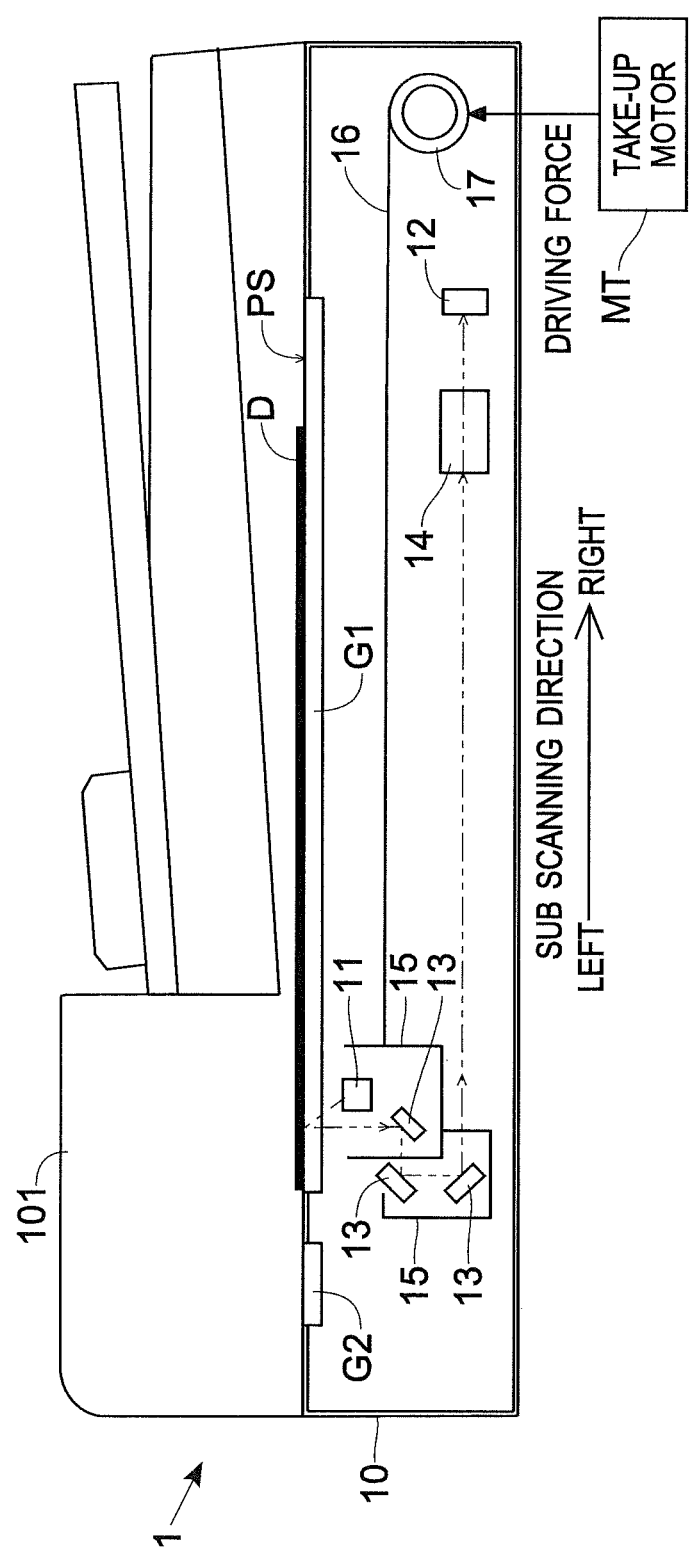
FIG. 2 is a view showing a configuration of an image reading section of the multifunction peripheral according to one embodiment of the disclosure.

As shown in FIG. 2, the image reading section 1, including a light source 11, an image sensor 12, a mirror 13, and a lens 14, reads a document D to generate image data of the document D. The light source 11, the image sensor 12, the mirror 13, and the lens 14 are housed inside a housing 10 of the image reading section 1. Placed on top of the housing 10 are a placement-and-reading contact glass G1 and a conveyance-and-reading contact glass G2.

For the placement-and-reading process, a document D is placed on a document placement surface PS of the placement-and-reading contact glass G1. The image reading section 1 reads the document D placed on the document placement surface PS. It is noted that the placement-and-reading contact glass G1 corresponds to 'contact glass.'

For the conveyance-and-reading process, the document D is set on a document conveyance unit 101 (see FIG. 1). The document conveyance unit 101 conveys the document D toward the conveyance-and-reading contact glass G2. While the document D is passing through on the conveyance-and-reading contact glass G2, the image reading section 1 reads the document D on the conveyance-and-reading contact glass G2.

Figure 3:
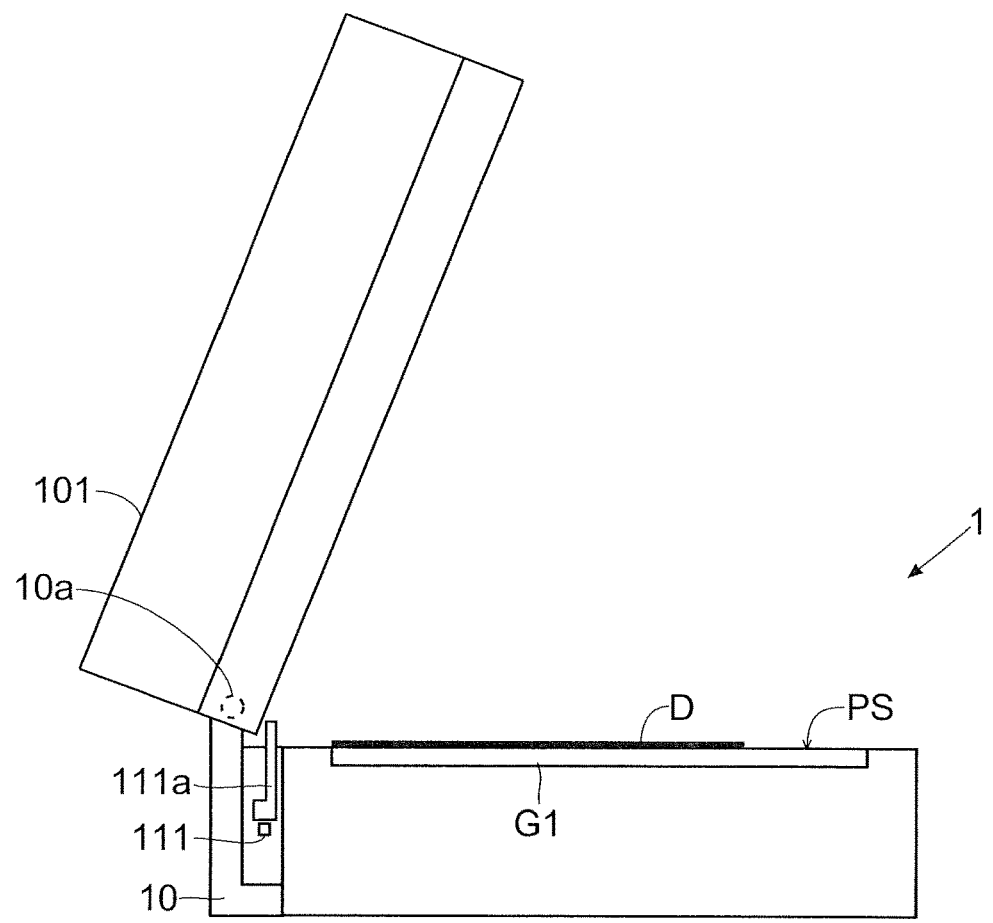
FIG. 3 is a view of a document conveyance unit of the multifunction peripheral according to one embodiment of the disclosure, where the document conveyance unit is opened and closed.
Figure 3:
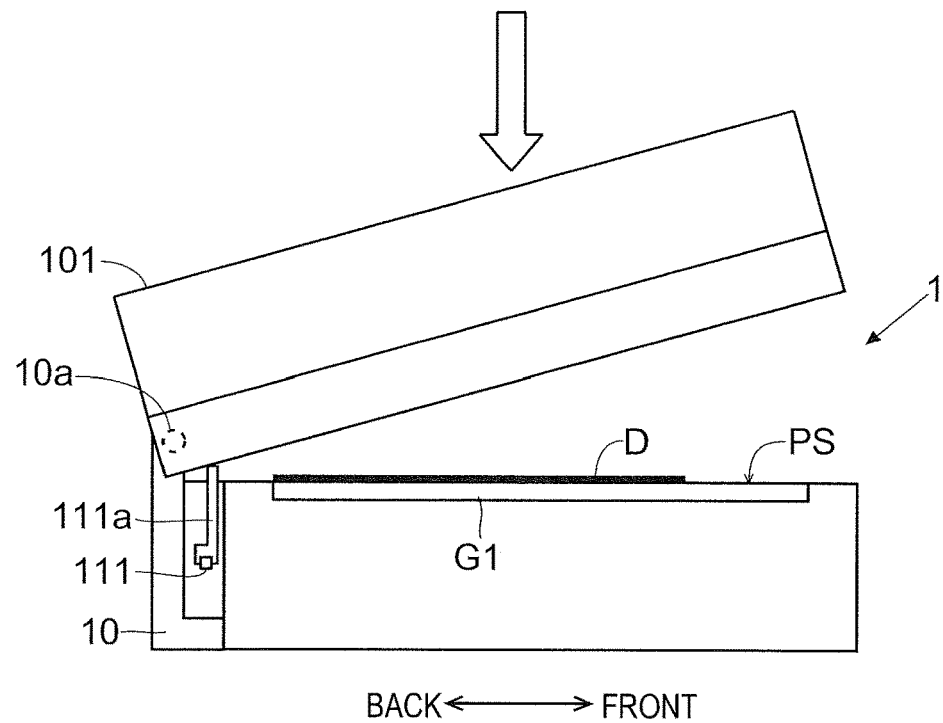

As shown in FIG. 3, the document conveyance unit 101 is openably and closably attached to the housing 10 of the image reading section 1. More specifically, a rotating shaft 10*a* is provided on an apparatus-back side of the housing 10. The document conveyance unit 101, which is pivotably (openably and closably) held on the rotating shaft 10*a* of the housing 10, pivots with the rotating shaft 10*a* of the housing 10 used as a fulcrum. That is, with an apparatus-front side part serving as a free end, the document conveyance unit 101 pivots such that the apparatus-front side part is swung up and down.

When the document conveyance unit 101 is closed, the placement-and-reading contact glass G1 is covered with the document conveyance unit 101. As a result of this, the document D placed on the placement-and-reading contact glass G1 (i.e., reading object of placement-and-reading process) can be pressed by the document conveyance unit 101.

In order to detect the opening and closing of the document conveyance unit 101, an opening/closing detection part 111 is provided on the housing 10 of the image reading section 1. As an example, the opening/closing detection part 111 is an optical sensor having a light-emitting part and a light-receiving part. The opening/closing detection part 111 targets, as a detection object, an actuator 111*a* which is up/down movable between the light-emitting part and the light-receiving part.

With the document conveyance unit 101 fully opened (in a state shown by the upper view of FIG. 3), the actuator 111*a* is protruded upward of the top surface of the housing 10 (the document placement surface PS of the placement-and-reading contact glass G1). In this case, the actuator 111*a* does not interrupt an optical path of the opening/closing detection part 111 (i.e., the opening/closing detection part 111 is turned on). In this state, gradually closing the document conveyance unit 101 causes the actuator 111*a* to be brought into contact with the document conveyance unit 101 and thereby pushed down. When the document conveyance unit 101 is closed until its inclination angle (an angle formed against the top surface of the housing 10) comes to a specified angle (i.e., in a state shown by the lower view of FIG. 3), the actuator 111*a* interrupts the optical path of the opening/closing detection part 111 (the opening/closing detection part 111 is turned off). Thereafter, when the document conveyance unit 101 is fully closed (see FIG. 1), the actuator 111*a* is pushed further downward by the document conveyance unit 101 while the optical path of the opening/closing detection part 111 remains interrupted by the actuator 111*a*.

Reverting to FIG. 2, the light source 11 includes a plurality of LED elements (not shown). The plurality of LED elements are arrayed in line along a main scanning direction (i.e., a direction vertical to the drawing sheet of FIG. 2). In the placement-and-reading process, the light source 11 applies light toward the placement-and-reading contact glass G1 (light transmitted by the placement-and-reading contact glass G1 is applied to the document D). In the conveyance-and-reading process, the light source 11 applies light toward the conveyance-and-reading contact glass G2 (light transmitted by the conveyance-and-reading contact glass G2 is applied to the document D). Reflected light reflected by the document D is reflected by the mirror 13 and guided to the lens 14. The lens 14 condenses reflected light.

The image sensor 12 includes line sensors corresponding to individual colors of R, G and B. A line sensor for each color is made up of CCDs (Charge Coupled Devices) each having a plurality of photoelectric conversion elements arrayed in line along the main scanning direction. The image sensor 12, when receiving reflected light from the document D (light condensed by the lens 14), performs photoelectric conversion, thereby accumulating electric charge, for each pixel on a line basis. Then, the image sensor 12 outputs analog signals (RGB signals) responsive to accumulated charges.

The light source 11 and the mirror 13 are fitted to a movable frame 15 which is movable in a sub scanning direction perpendicular to the main scanning direction. The movable frame 15 is coupled to a wire 16. The wire 16 is wound around a take-up drum 17. The take-up drum 17 is rotated upon reception of driving force of a take-up motor MT. By driving of the take-up motor MT, the take-up drum 17 is rotated, so that the movable frame 15 is moved in the sub scanning direction. That is, the light source 11 and the mirror 13 are moved in the sub scanning direction.

In execution of the placement-and-reading process, the movable frame 15 including the light source 11 is moved in the sub scanning direction (i.e., in a from-left-to-right direction as viewed from the front). While the movable frame 15 is moving in the sub scanning direction, the light source 11 applies light toward the placement-and-reading contact glass G1. The image sensor 12 successively and repeatedly performs photoelectric conversion of reflected light reflected by the document D on the placement-and-reading contact glass G1. As a result of this, reading of the document D is fulfilled on the line basis.

In execution of the conveyance-and-reading process, the movable frame 15 including the light source 11 is moved to under the conveyance-and-reading contact glass G2. Under the conveyance-and-reading contact glass G2, the light source 11 applies light toward the conveyance-and-reading contact glass G2. The image sensor 12 successively and repeatedly performs photoelectric conversion of reflected light reflected by the document D passing through on the conveyance-and-reading contact glass G2. As a result of this, reading of the document D is fulfilled on the line basis.

Figure 4:
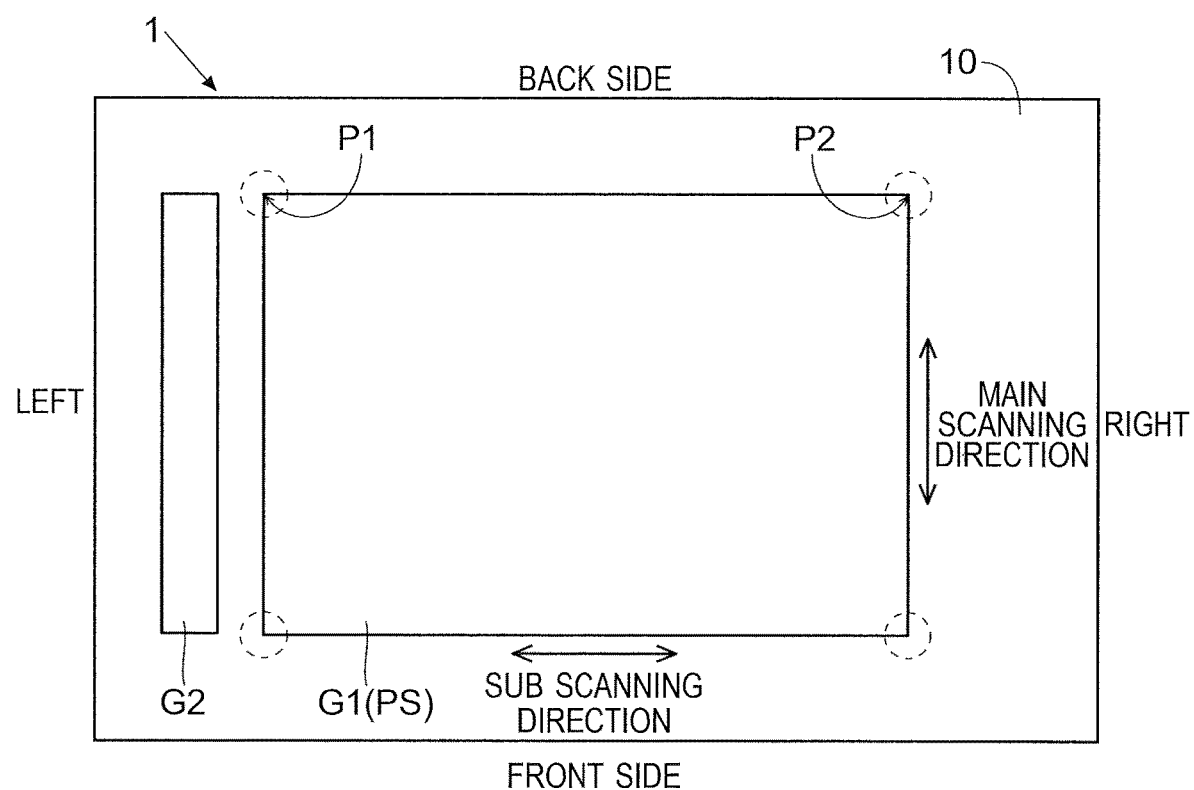
FIG. 4 is a plan view of a placement-and-reading contact glass of the multifunction peripheral according to one embodiment of the disclosure.

In this connection, as shown in FIG. 4, the document placement surface PS of the placement-and-reading contact glass G1 is, as viewed in a plan view, formed into a quadrangular shape (a rectangular shape that is longer in the left/right direction as viewed from the front). That is, the document placement surface PS has four corner portions. In FIG. 4, the four corner portions of the document placement surface PS are encircled by broken lines, respectively. Also, the document placement surface PS has a size larger than a specification-base maximum document size that is readable for the multifunction peripheral 100. Accordingly, even when a document D of the maximum size is placed on the document placement surface PS, it never occurs that the document placement surface PS is entirely covered with the document D.

For the multifunction peripheral 100 to execute a job of copying images (character images, graphic images, etc.) recorded on the document D as they are, it is predetermined that one of the four corner portions of the document D should be set coincident with a normal alignment position P1 (a position with which a corner of the document D should be set coincident in a case where it is undesirable to erase handwritten images from image data of the document D). By the manufacturer of the multifunction peripheral 100, one of the four corner positions (positions of corner portions) of the document placement surface PS is set as the normal alignment position P1. As an example, the normal alignment position P1 is set at a corner position positioned on one end side (back side) in the main scanning direction and on one end side (left side) in the sub scanning direction.

Further, by the manufacturer of the multifunction peripheral 100, a corner position opposed in the sub scanning direction to the normal alignment position P1 out of the four corner positions of the document placement surface PS is set as a handwritten-image erasing function-dedicated alignment position P2 (a position with which a corner of the document D should be set coincident when it is desired to erase handwritten images from the image data of the document D). It is noted that the handwritten-image erasing function-dedicated alignment position P2 corresponds to 'specified position.'

Hereinafter, the normal alignment position P1 will be referred to as first alignment position P1, and the handwritten-image erasing function-dedicated alignment position P2 will be referred to as second alignment position P2. In addition, the handwritten-image erasing function will be detailed later.

A document detection part 112 (see FIG. 5; not shown in FIG. 4) for detecting presence or absence of a document D at the second alignment position P2 is provided under the second alignment position P2 of the placement-and-reading contact glass G1 (on the back-surface side of the placement-and-reading contact glass G1 opposite to the document placement surface PS side). As an example, the document detection part 112 is a reflection type optical sensor, which varies in output value in response to the presence or absence of the document D at the second alignment position P2.

Reverting to FIG. 1, the printing section 2 conveys a paper sheet P along a sheet conveyance path (shown by broken line in FIG. 1). Also the printing section 2 forms toner images based on image data of an image which is to be printed. Then, the printing section 2 prints out the toner images on the sheet P that is under conveyance. That is, the printing section 2 executes a print job. For example, the printing section 2 executes printing based on image data of the document D obtained by placement-and-reading process or conveyance-and-reading process by the image reading section 1.

The printing section 2 includes a sheet feed part 21, an image forming part 22, and a fixing part 23. The sheet feed part 21 feeds one of paper sheets P contained in a cassette CA onto the sheet conveyance path. The sheet P fed onto the sheet conveyance path is conveyed along the sheet conveyance path.

The image forming part 22 includes mechanism parts 22K, 22Y, 22C and 22M corresponding to individual colors of black (K), yellow (Y), cyan (C) and magenta (M), respectively. The mechanism parts 22K, 22Y, 22C and 22M form toner images (graphic images) of their corresponding colors, respectively, and then primarily transfer the toner images onto an intermediate belt. The toner images transferred onto the intermediate belt are secondarily transferred (printed) onto the sheet P that is under conveyance.

The fixing part 23 pressurizes and heats the sheet P onto which the toner images have been transferred. As a result, the toner images are fixed on the sheet P. The sheet P with the toner images fixed thereon is conveyed along the sheet conveyance path and discharged out as it is.

The operation panel 3 includes a touch panel display 31 and hardware keys 32. The touch panel display 31 displays a setting screen, in which software keys are arranged, to accept various types of settings and instructions from a user. The hardware keys 32 are provided in plurality on the operation panel 3. The hardware keys 32 include, for example, a start key for accepting, from the user, an execution instruction for a job involving reading of the document D.

Figure 5:
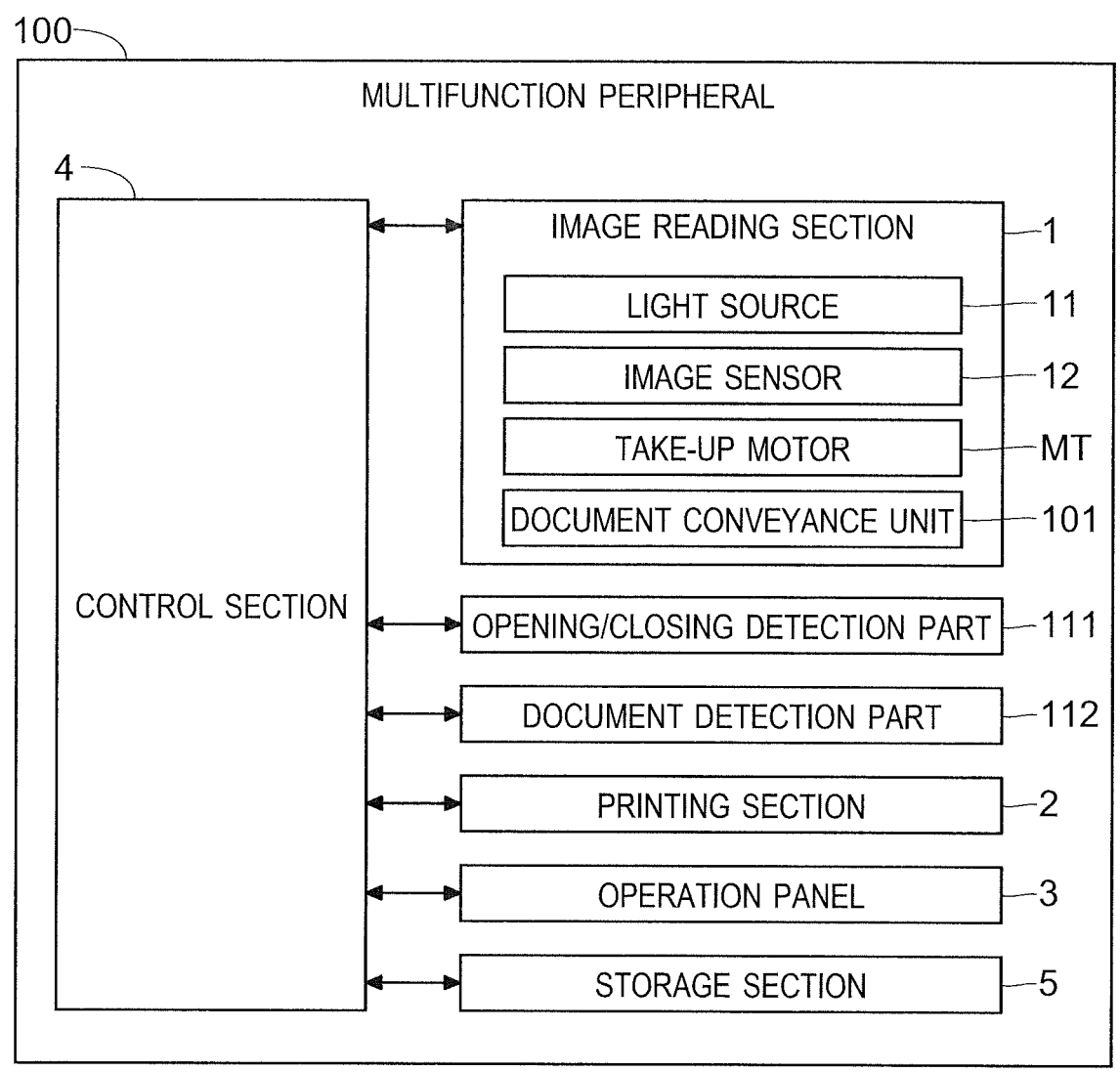
FIG. 5 is a block diagram showing the configuration of the multifunction peripheral according to one embodiment of the disclosure.

As shown in FIG. 5, the multifunction peripheral 100 also includes a control section 4. The control section 4 includes a CPU and memory. The CPU operates based on control-dedicated programs and data to execute processes for controlling individual parts and sections of the multifunction peripheral 100. The memory includes nonvolatile memory (ROM) and volatile memory (RAM). The control-dedicated programs and data are to be stored in the ROM and developed in the RAM.

The control section 4 is connected to the image reading section 1. The control section 4 executes processes for controlling the image reading section 1. Also, the control section 4 executes specified image processing for image data of the document D obtained through the placement-and-reading process or the conveyance-and-reading process performed by the image reading section 1. In order to execute image processing, the control section 4 is equipped with, for example, image processing-exclusive circuits (image processing section). Further, the control section 4 executes character recognition process for image data of the document D. A character recognition program for executing the character recognition process is to be stored in the memory of the control section 4. OCR (Optical Character Recognition) techniques are used for the character recognition process by the control section 4.

The control section 4 is connected to the light source 11 and the image sensor 12 to control light on/off operation of the light source 11 and reading operation of the image sensor 12. The control section 4 is also connected to the take-up motor MT. The control section 4 controls drive of the take-up motor MT to switch over between rotation and rotational halt of the take-up drum 17 and moreover switch over the rotational direction of the take-up drum 17. By controlling the drive of the take-up motor MT, the control section 4 makes the movable frame 15 including the light source 11 properly moved in the sub scanning direction. The control section 4 is further connected to the document conveyance unit 101 to control conveyance operation of the document conveyance unit 101.

The control section 4 also executes a process of amplifying analog outputs of the image sensor 12, a process of converting analog outputs into digital data, and the like. In addition, a data processing section for executing these processes may be provided independently of the control section 4. The control section 4 also executes processes for image data such as color conversion process (a process of converting image data from RGB into CMYK form) and scale-up/down process. Furthermore, the control section 4 executes later-described handwritten-image erasing process.

The opening/closing detection part 111 is connected to the control section 4. Based on an output value of the opening/closing detection part 111, the control section 4 detects an opening or a closing of the document conveyance unit 101. Upon detecting that the output value of the opening/closing detection part 111 has changed from a first level (e.g., L level) to a second level (e.g., H level), i.e. when the optical path of the opening/closing detection part 111 has changed from light-interrupted state to light-uninterrupted state, the control section 4 decides that the document conveyance unit 101 has changed from closed to open state. On the other hand, upon detecting that the output value of the opening/closing detection part 111 has changed from the second level to the first level, i.e. when the optical path of the opening/closing detection part 111 has changed from light-uninterrupted state to light-interrupted state, the control section 4 decides that the document conveyance unit 101 has changed from open state to closed state.

The document detection part 112 is connected to the control section 4. Based on an output value of the document detection part 112, the control section 4 detects presence or absence of the document D at the second alignment position P2 of the document placement surface PS of the placement-and-reading contact glass G1 (i.e., decides whether or not the document D is present at the second alignment position P2). For example, when the output value of the opening/closing detection part 111 has changed from the second level to the first level, the control section 4 checks for an output value of the document detection part 112. In this case, when the output value of the document detection part 112 at a checking time point has come to a value indicating presence of the document D, the control section 4 decides that the document D is present at the second alignment position P2. Conversely, when the output value of the document detection part 112 at the checking time point has come to a value indicating absence of the document D, the control section 4 decides that the document D is absent at the second alignment position P2.

The control section 4 also executes job processing for executing a job using image data of the document D obtained through the reading of the document D by the image reading section 1 (the image data including later-described erasing-processed image data). Such jobs include print job and preservation job. The print job is executed by the printing section 2. Further, a storage section 5 including ROM (e.g., EEPROM), HDD or other nonvolatile storage device is provided in the multifunction peripheral 100, so that the preservation job is executed by the storage section 5. The printing section 2 and the storage section 5 are connected to the control section 4.

As to the print job, an execution instruction for a print job using image data of the document D read by the image reading section 1 (the image data including later-described erasing-processed image data) is given from the control section 4 to the printing section 2 (the control section 4 executes a process for executing the print job). Upon receiving the print-job execution instruction, the printing section 2 forms toner images based on the image data of the document D read by the image reading section 1, and transfers the toner images onto the sheet P.

As to the preservation job, an execution instruction for a preservation job using image data of the document D read by the image reading section 1 (the image data including later-described erasing-processed image data) is given from the control section 4 to the storage section 5 (the control section 4 executes a process for executing the preservation job). Upon receiving the preservation-job execution instruction, the storage section 5 preserves image data of the document D read by the image reading section 1. The preservation-object image data is subjected to image processing by the control section 4, and transmitted from the control section 4 to the storage section 5. Then, the preservation-object image data is stored in a predetermined storage area of the storage section 5. With the image data preserved in the storage section 5, it becomes possible to later execute printing based on the preserved image data preserved by this process. Also, with an external device communicatably connected to the multifunction peripheral 100, it becomes possible to transmit the preserved image data to the external device.

<Handwritten-Image Erasing Function>

Figure 6:
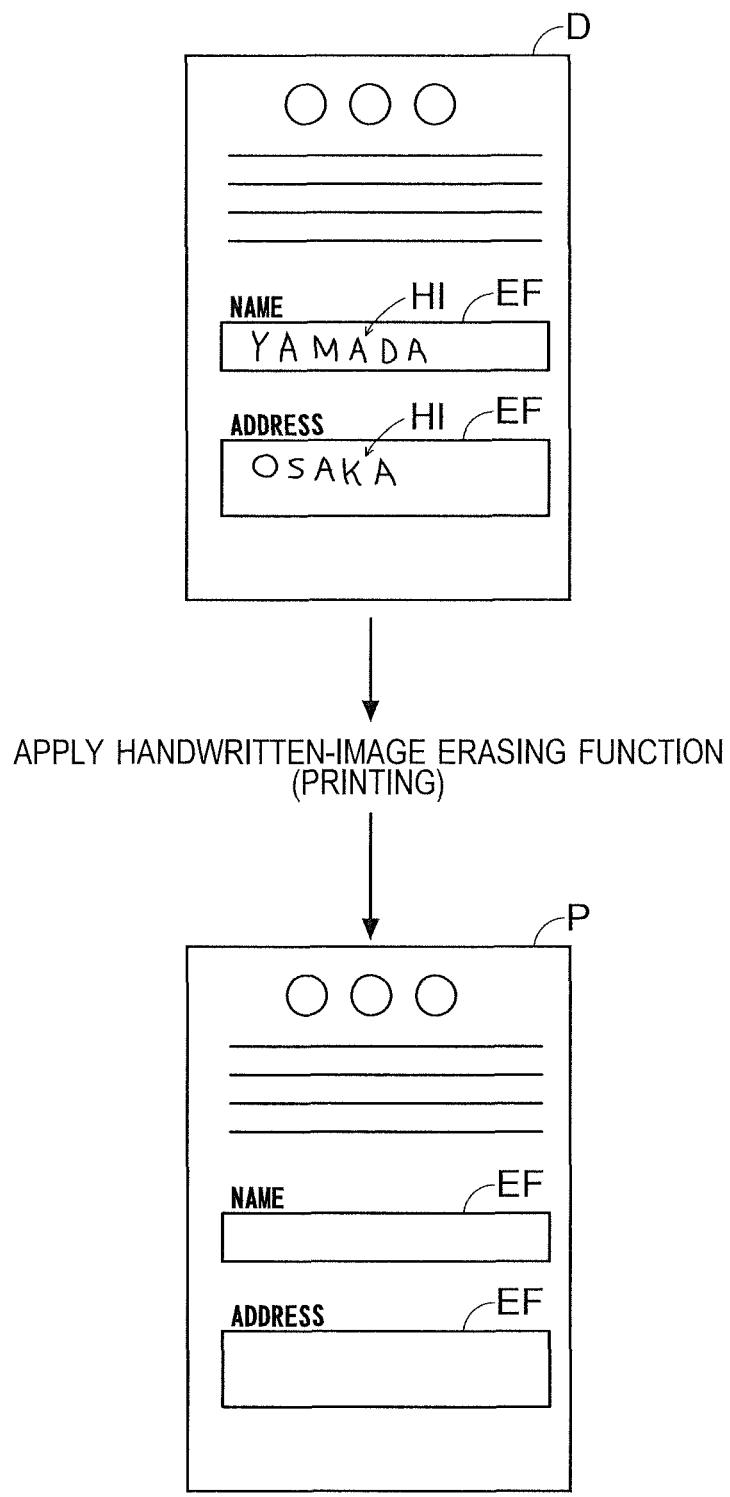
FIG. 6 is a view for explaining a handwritten-image erasing function to be installed on the multifunction peripheral according to one embodiment of the disclosure.

The multifunction peripheral 100 is equipped with a handwritten-image erasing function of generating image data, which is obtained by erasing handwritten images from image data of the document D obtained by reading of the document D (hereinafter, referred to as erasing-processed image data), followed by printing, on the sheet P, images based on the erasing-processed image data or by preserving the erasing-processed image data, or the like. With the handwritten-image erasing function applied, for example, even after characters (handwritten images HI) are entered into entry fields EF of the document D such as an application form or an agreement form as shown in FIG. 6, it is implementable to print, on the sheet P, images of the document D from which the handwritten images HI in the entry fields EF have been erased.

The control section 4 executes the handwritten-image erasing process of erasing handwritten images from image data of the document D read by the image reading section 1 (a process of generating erasing-processed image data). After the execution of the handwritten-image erasing process, the control section 4 instructs the printing section 2 or the storage section 5 to execute a job using the image data that has been subjected to the handwritten-image erasing process (erasing-processed image data).

For execution of a job, for example, the operation panel 3 accepts selection of an execution job from a user. When the user-selected job is a print job, the control section 4 instructs the printing section 2 to execute a job of printing, on the sheet P, images based on the image data that has been subjected to the handwritten-image erasing process. When the user-selected job is a preservation job, the control section 4 instructs the storage section 5 to preserve the image data subjected to the handwritten-image erasing process into a predetermined storage area.

In this connection, the control section 4 targets, as a process object of the handwritten-image erasing process, image data of the document D obtained by the placement-and-reading process by the image reading section 1. However, the control section 4 does not execute the handwritten-image erasing process unless a predetermined process execution condition as a condition for executing the handwritten-image erasing process is satisfied.

For execution of the placement-and-reading process by the image reading section 1, the control section 4 executes a conditional decision process of deciding whether or not a process execution condition is satisfied. The conditional decision process by the control section 4 is executed based on a placement position of the document D placed on the placement-and-reading contact glass G1.

As a result of the conditional decision process, when the process execution condition is satisfied, the control section 4 executes the handwritten-image erasing process for image data of the document D read by the image reading section 1. On the other hand, when the process execution condition is not satisfied, the control section 4 does not execute the handwritten-image erasing process for the image data of the document D read by the image reading section 1.

Hereinbelow, a flow of processes (conditional decision process and handwritten-image erasing process) to be executed by the control section 4 will be described with reference to the flowchart shown in FIG. 7.

Figure 7:
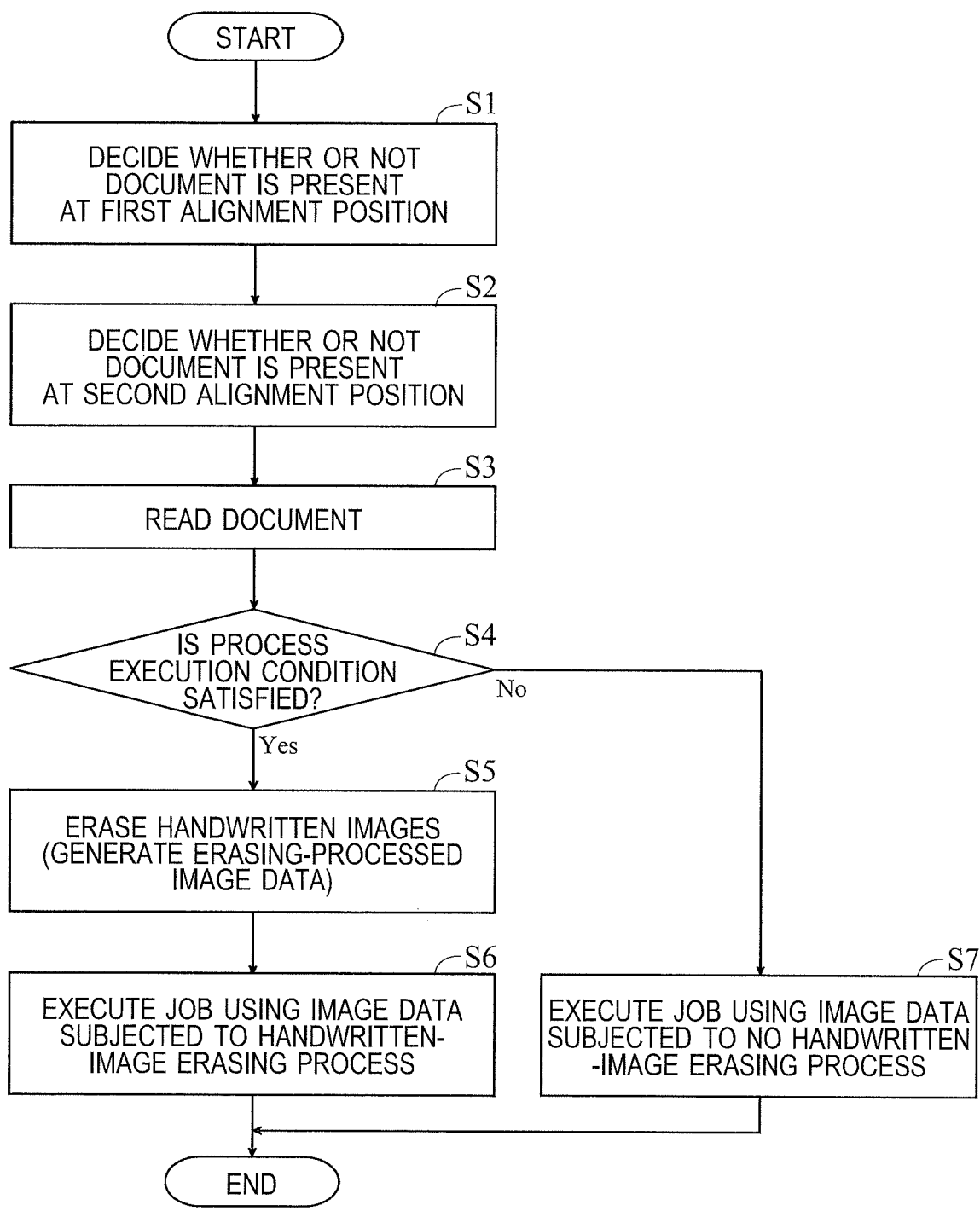
FIG. 7 is a flowchart showing a flow of processes (conditional decision process and handwritten-image erasing process) to be executed by a control section of the multifunction peripheral according to one embodiment of the disclosure.

At a start point of the flowchart shown in FIG. 7, it is assumed that the document conveyance unit 101 is opened. That the document conveyance unit 101 is opened implies that the user is under work of placing the document D onto the document placement surface PS. That is, the document conveyance unit 101 is opened before execution of the placement-and-reading process by the image reading section 1. After the placement of the document D on the document placement surface PS, the user starts work of closing the document conveyance unit 101. Then, at a time when the control section 4 detects that the document conveyance unit 101 has been closed (the output value of the opening/closing detection part 111 has changed from the second level to the first level), the flowchart shown in FIG. 7 gets started.

At step S1, the control section 4 makes a first decision as to whether or not the document D is present at the first alignment position P1 of the document placement surface PS. In this case, upon detecting that the document conveyance unit 101 has been closed, the control section 4 instructs the image reading section 1 to execute a prescan. In execution of the prescan, the image reading section 1 reads an area of the placement-and-reading contact glass G1 on one end side of the sub scanning direction (on the side which is the left side as viewed from the front and on which the first alignment position P1 is present). For example, a specified number of lines counting from sub-scanning-direction one end side of the placement-and-reading contact glass G1 are read by the image reading section 1. Then, based on image data obtained by the prescan executed by the image reading section 1, the control section 4 decides whether or not the document D is present at the first alignment position P1 of the document placement surface PS.

At step S2, based on an output value of the document detection part 112, the control section 4 makes a second decision as to whether or not the document D is present at the second alignment position P2 of the document placement surface PS. At this time point, the document conveyance unit 101 has not been fully closed. Therefore, the output value of the document detection part 112 differs depending on the presence or absence of the document D at the second alignment position P2. That is, when the document D is present at the second alignment position P2, light emitted from the document detection part 112 and transmitted by the placement-and-reading contact glass G1 is reflected by the document D. On the other hand, when the document D is absent at the second alignment position P2, light emitted from the document detection part 112 is transmitted by the placement-and-reading contact glass G1 so as to pass outside.

After the start of the work of closing the document conveyance unit 101, when the document conveyance unit 101 is fully closed, the user makes a depressing operation with the start key of the operation panel 3 in order to give a job execution instruction to the multifunction peripheral 100. When the control section 4 detects the depressing operation with the start key of the operation panel 3, the processing flow moves on to step S3.

At step S3, the control section 4 instructs the image reading section 1 to execute placement-and-reading process. The image reading section 1 reads the document D on the document placement surface PS to generate image data of the document D. In addition, the control section 4 performs various types of image processing on the image data obtained through the placement-and-reading process by the image reading section 1.

At step S4, the control section 4 decides whether or not a condition for executing the handwritten-image erasing process (process execution condition) is satisfied. When the first decision is that the document D is present at the first alignment position P1, or when the second decision is that the document D is absent at the second alignment position P2, the control section 4 decides that the process execution condition is unsatisfied. Consequently, upon deciding that the document D is absent at the first alignment position P1 and moreover upon deciding that the document D is present at the second alignment position P2, the control section 4 decides that the process execution condition is satisfied.

Figure 8:
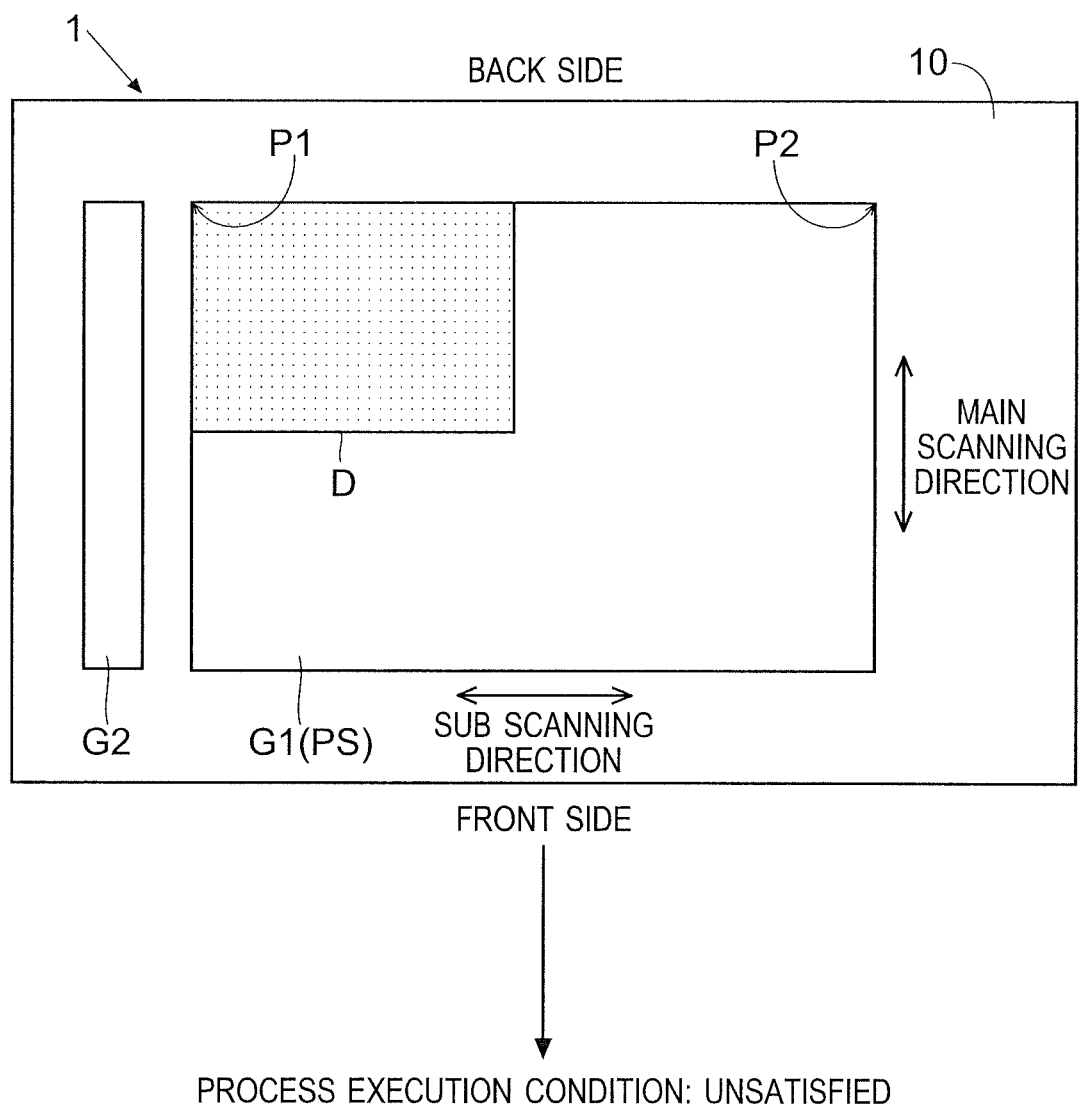
FIG. 8 is a view showing a result of the conditional decision process in one case where a document placed on a document placement surface of the multifunction peripheral according to one embodiment of the disclosure has one corner present at a first alignment position.
Figure 9:
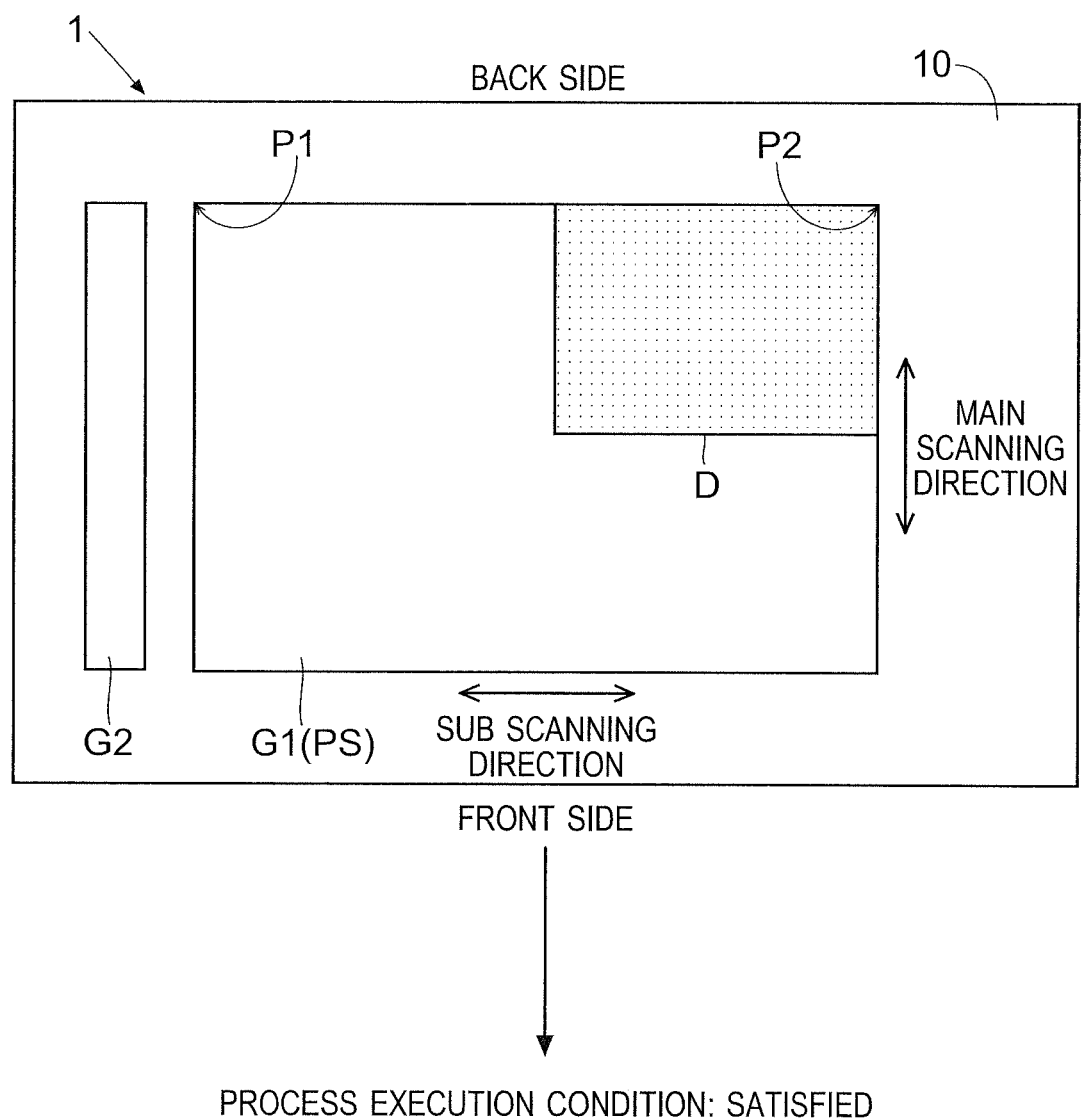
FIG. 9 is a view showing a result of the conditional decision process in another case where the document placed on the document placement surface of the multifunction peripheral according to one embodiment of the disclosure has one corner present at a second alignment position.

For example, when a corner of the document D is set coincident with the first alignment position P1 of the document placement surface PS as shown in FIG. 8, the control section 4 decides that the process execution condition is unsatisfied. On the other hand, when a corner of the document D is set coincident with the second alignment position P2 of the document placement surface PS as shown in FIG. 9, the control section 4 decides that the process execution condition is satisfied.

Reverting to FIG. 7, when the control section 4 decides at step S4 that the process execution condition is satisfied, the processing flow moves on to step S5. Moving to step S5, the control section 4 executes the handwritten-image erasing process of erasing handwritten images from image data of the document D read by the image reading section 1 (i.e., generates erasing-processed image data).

In this case, the control section 4 executes a character recognition process for the image data of the document D. In order to allow the control section 4 to execute the character recognition process, for example, a character database containing character patterns (standard patterns) for use of pattern matching is previously stored in the memory of the control section 4.

In execution of the character recognition process, the control section 4 subjects the image data of the document D to layout analysis or the like to specifically determine a character area, and then extracts character images from the character area. Then, the control section 4 performs a process of comparing extracted character images extracted from the character area with standard patterns (matching process), and recognizes characters based on comparison results. In this case, when the extracted character image are handwritten images, there result lower similarities between the extracted character images and relevant standard patterns. Therefore, for example, the control section 4 recognizes extracted character images each having a similarity to standard patterns lower than a predetermined threshold, and then erases the recognized extracted character images as handwritten images.

At step S6, the control section 4 executes a job process for executing a job using the image data subjected to the handwritten-image erasing process (i.e., erasing-processed image data). As a result of this, a print job of printing, on the sheet P, images based on the erasing-processed image data is executed by the printing section 2. Otherwise, a preservation job of preserving erasing-processed image data in a predetermined storage area is executed by the storage section 5.

When the control section 4 decides at step S4 that the process execution condition is unsatisfied, the processing flow moves on to step S7. Moving to step S7, the control section 4 does not execute the handwritten-image erasing process. In this case, the control section 4 executes a job process for executing a job using image data subjected to no handwritten-image erasing process. That is, the printing section 2 prints out, on the sheet P, images based on image data subjected to no handwritten-image erasing process.

Otherwise, the storage section 5 stores the image data subjected to no handwritten-image erasing process in a storage area.

Figure 10:
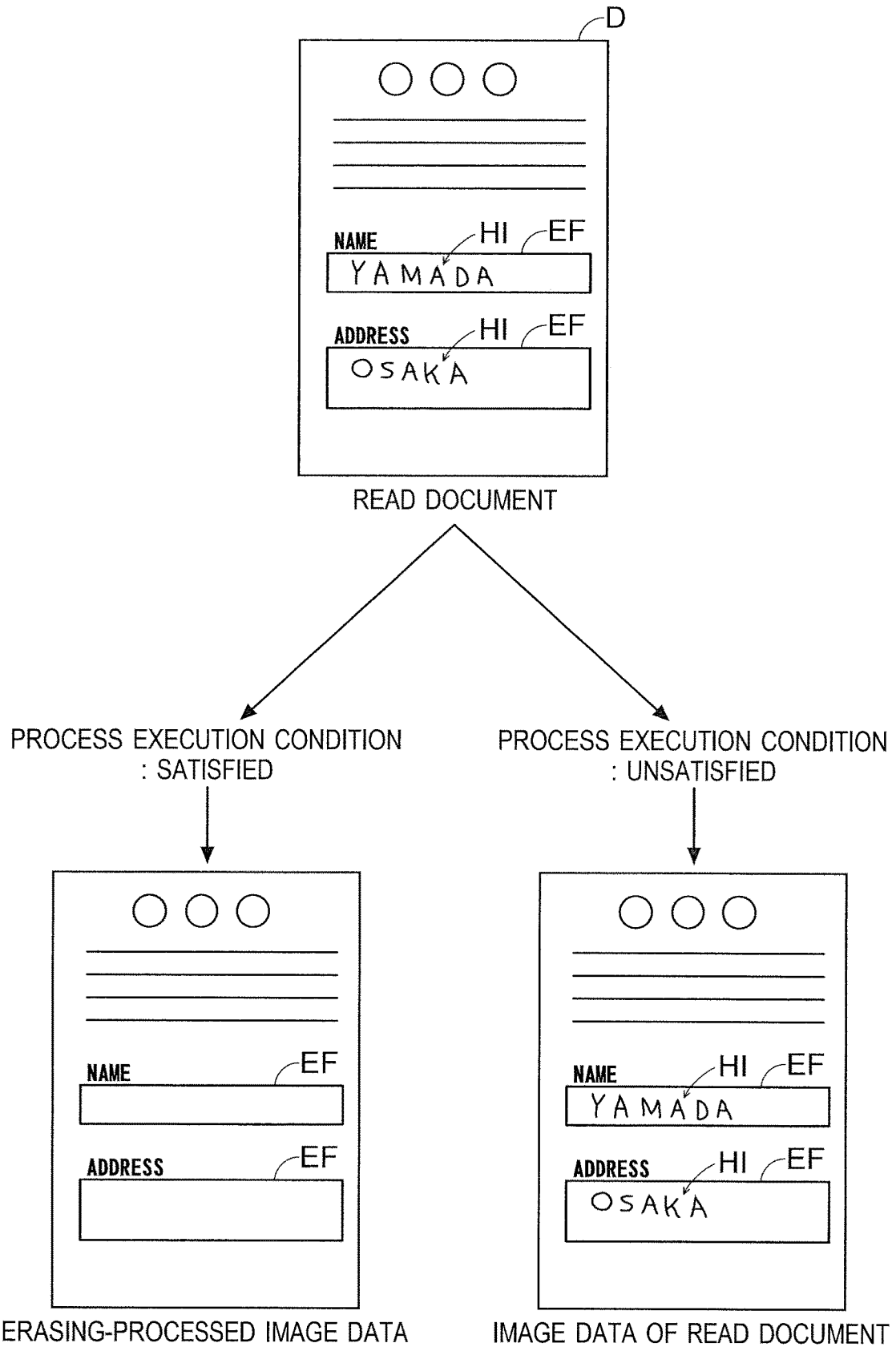
FIG. 10 is a view showing image data (image data generated in both cases where a process execution condition is satisfied and unsatisfied, respectively) to be generated by the multifunction peripheral according to one embodiment of the disclosure.

For example, it is assumed that the image reading section 1 has read such a document D as shown in the upper view of FIG. 10. In this case, when the control section 4 decides that the process execution condition is satisfied, such erasing-processed image data as shown in the lower left view of FIG. 10 (image data in which handwritten images HI have been erased from entry fields EF) are generated, followed by execution of a job using the erasing-processed image data. On the other hand, when the control section 4 decides that the process execution condition is unsatisfied, a job using such image data as shown in the lower right view of FIG. 10 (image data in which handwritten images HI have not been erased from the entry fields EF) is executed.

The multifunction peripheral 100 (image forming apparatus) of this embodiment, as described hereinabove, includes: the image reading section 1 for reading a document D placed on the document placement surface PS of the placement-and-reading contact glass G1 (contact glass) to generate image data of the document D; and the control section 4 for deciding whether or not the document D is present at the second alignment position P2 (specified position) of the document placement surface PS and for, upon deciding that the document D is present at the second alignment position P2, executing a handwritten-image erasing process of erasing handwritten images from image data of the document D read by the image reading section 1.

With the configuration of this embodiment, in order to acquire erasing-processed image data in which handwritten images have been erased from image data of a document D, the document D is placed on the document placement surface PS of the placement-and-reading contact glass G1 so as to cover the second alignment position P2, where it is decided that the document D is present at the second alignment position P2. Then, the handwritten-image erasing process of erasing handwritten images from the image data of the document D is executed. Accordingly, the user is allowed to acquire erasing-processed image data in which handwritten images have been erased from the image data of the document D even without making settings related to the handwritten-image erasing process (i.e., only by placing the document D on the document placement surface PS so as to cover the second alignment position P2 therewith), hence the user's convenience.

Also in this embodiment, as described above, upon deciding that the document D is absent at the second alignment position P2, the control section 4 does not execute the handwritten-image erasing process. As a result of this, the handwritten-image erasing process by the control section 4 can be kept unapplied even without performing any operation (setting) on the operation panel 3. That is, handwritten images, when it is desired, may be kept unerased from the image data of the document D only by placing the document D on the document placement surface PS such that a corner of the document D becomes coincident with the first alignment position P1.

Also in this embodiment, as described above, the document detection part 112 for varying its output value depending on the presence or absence of the document D at the second alignment position P2 of the document placement surface PS is provided on the back side of the placement-and-reading contact glass G1. As a result of this, the control section 4 is allowed to decide, with simplicity, whether or not the document D is present at the second alignment position P2.

Further in this embodiment, as described above, before reading of the document D by the image reading section 1, the control section 4 instructs the image reading section 1 to execute a prescan process of reading an area of the placement-and-reading contact glass G1 on its one end side in the sub scanning direction. Based on image data obtained through the prescan process, the control section 4 decides whether or not the document D is present at the first alignment position P1. Then, when it is decided that the document D is present at the second alignment position P2, and moreover when it is decided that the document D is absent at the first alignment position P1, the control section 4 executes the handwritten-image erasing process (decides that the process execution condition is satisfied).

For example, it is assumed that the document D, which has been placed at the first alignment position P1, is shifted to the second alignment position P2 while the document conveyance unit 101 is closed (while the prescan process is performed). With the document D shifted to the second alignment position P2 like this, it is decided by the second decision based on an output value of the document detection part 112 that the document D is present at the second alignment position P2. However, it is decided also by the first decision based on image data obtained by the prescan process that the document D is present at the first alignment position P1. Accordingly, in this example, the control section 4 decides that the process execution condition is unsatisfied, therefore suppressing the handwritten-image erasing process. That is, there can be suppressed a disadvantageous possibility that whereas the document D has been placed at the first alignment position P1, handwritten images may be erased from the image data of the document D.

As a modification, at step S4 of the flowchart shown in FIG. 7, the control section 4, based on only a result of the second decision, may decide whether or not the handwritten-image erasing process is executed. That is, the process of step S1 (first decision by the control section 4) may be omitted. In this case, upon deciding that the document D is present at the second alignment position P2 of the document placement surface PS, the control section 4 executes the handwritten-image erasing process (decides that the process execution condition is satisfied).

Also at step S4 of the flowchart shown in FIG. 7, the control section 4 may further decide whether or not the handwritten-image erasing process is executed, based on not only the placement position of the document D on the document placement surface PS but also the orientation of the document D on the document placement surface PS. In this case, the control section 4 executes an orientation discriminating process of recognizing an orientation of characters present in image data of the document D read by the image reading section 1 (characters recognized by character recognition process) and discriminating the recognized character orientation as the orientation of the document D placed on the document placement surface PS. Then, regardless of the placement position of the document D on the document placement surface PS (i.e., even when the document D is absent at the first alignment position P1 and moreover when the document D is present at the second alignment position P2), unless the orientation of the document D discriminated by the orientation discriminating process is a specified orientation, the control section 4 decides that the process execution condition is unsatisfied and suppresses the handwritten-image erasing process.

Figure 11:
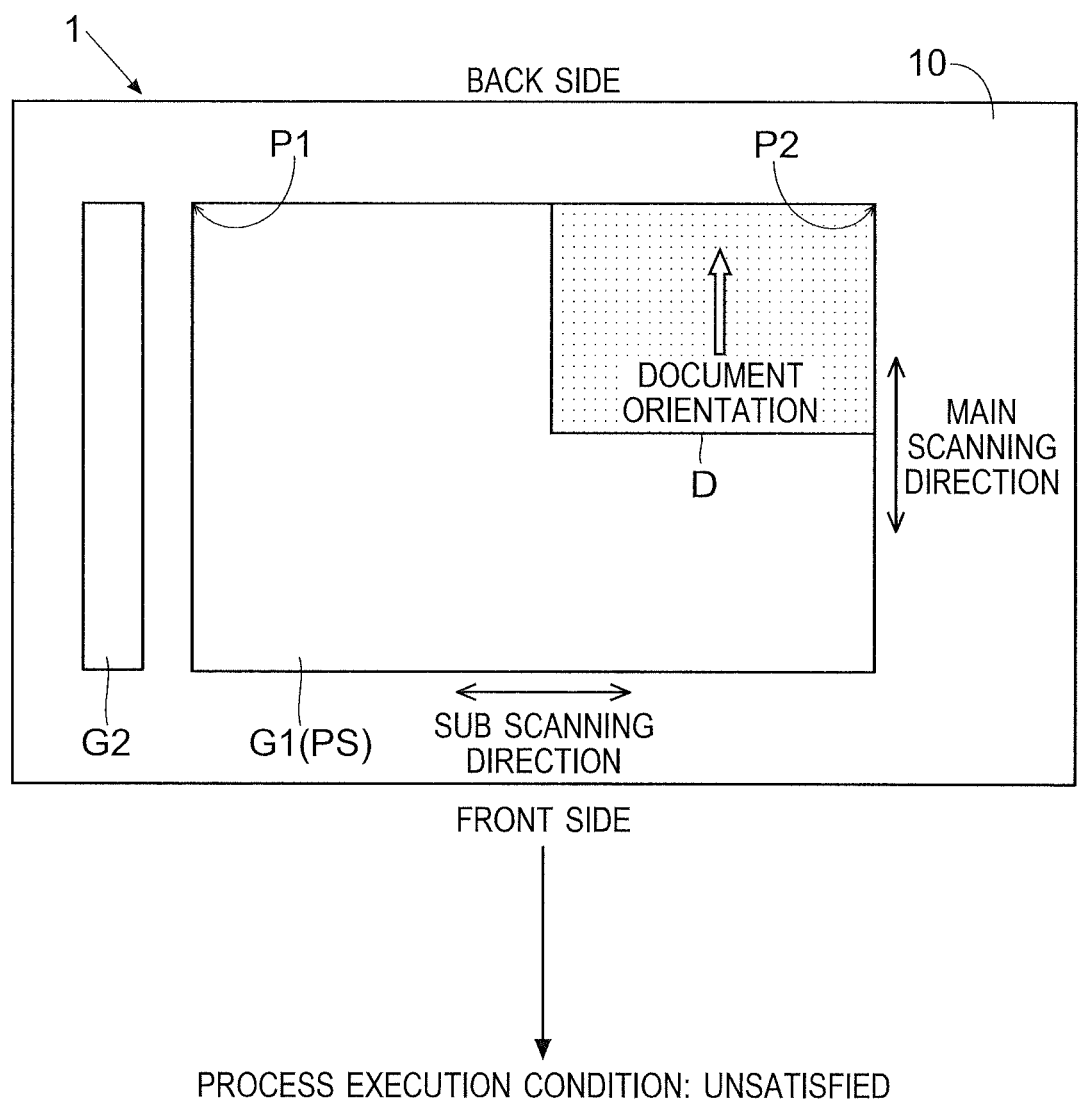
FIG. 11 is a view showing a result of the conditional decision process in one case where the orientation of the document placed on the document placement surface of the multifunction peripheral according to one embodiment of the disclosure is not a specified orientation.
Figure 12:
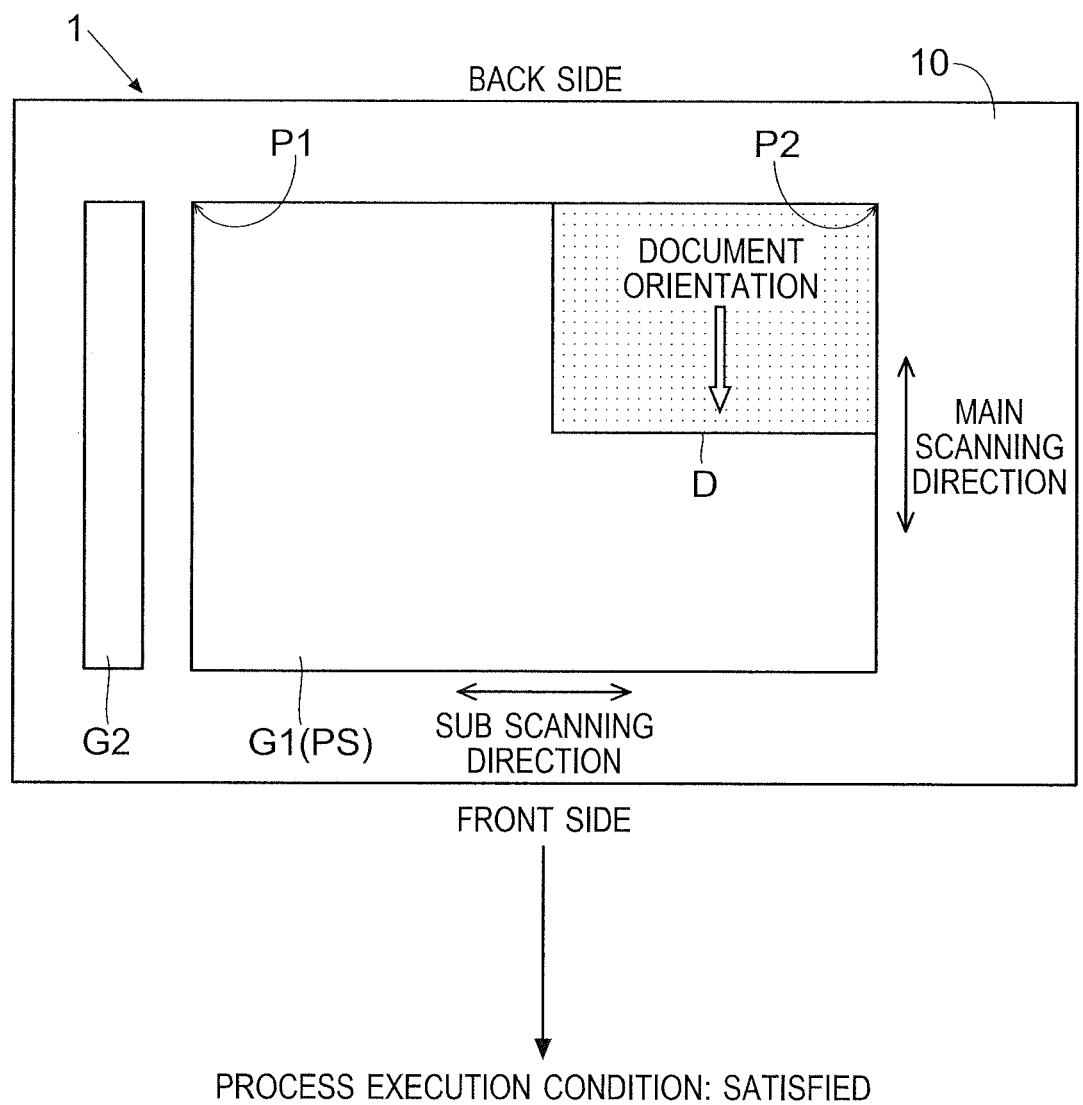
FIG. 12 is a view showing a result of the conditional decision process in another case where the orientation of the document placed on the document placement surface of the multifunction peripheral according to one embodiment of the disclosure is the specified orientation.

The specified orientation is, for example, set to a direction from one end side (back side) to the other end side (front side) in the main scanning direction. In this case, as shown in FIG. 11, unless the orientation (indicated by a white or unfilled arrow in FIG. 11) of the document D is up/down inverted as viewed from the front, the orientation of the document D is different from the specified orientation, so that the handwritten-image erasing process by the control section 4 is suppressed (it is decided that the process execution condition is unsatisfied). In addition, although not shown, the handwritten-image erasing process by the control section 4 is suppressed also when the document D is oriented rightward or leftward. On the other hand, as shown in FIG. 12, when the document D is placed on the document placement surface PS such that the orientation (indicated by a white or unfilled arrow in FIG. 12) of the document D is up/down inverted as viewed from the front, the orientation of the document D becomes identical with the specified orientation, so that the handwritten-image erasing process by the control section 4 is executed (it is decided that the process execution condition is satisfied).

With this configuration, in the case where the multifunction peripheral 100 is made to execute a job of copying images recorded on the document D as they are, even when the user has erroneously placed the document D on the document placement surface PS such that a corner of the document D becomes coincident with the second alignment position P2, the handwritten-image erasing process by the control section 4 is suppressed unless the orientation of the document D is up/down inverted. That is, there can be suppressed a possibility that the handwritten-image erasing process by the control section 4 may unnecessarily be executed.

As another modification, upon deciding that the process execution condition is satisfied (when image data of the document D read by the image reading section 1 has been subjected to the handwritten-image erasing process), the control section 4 recognizes either one of a long-side direction or a short-side direction of the image data subjected to the handwritten-image erasing process as an objective direction (e.g., widthwise direction). Then, given that the objective direction is along the main scanning direction, the control section 4 executes a job process for executing one of a print job and a preservation job (e.g., executes a job process for executing a print job). On the other hand, given that the objective direction is along the sub scanning direction, the control section 4 executes a job process for executing the other of the print job and the preservation job (e.g., executes a job process for executing the preservation job).

Figure 13:
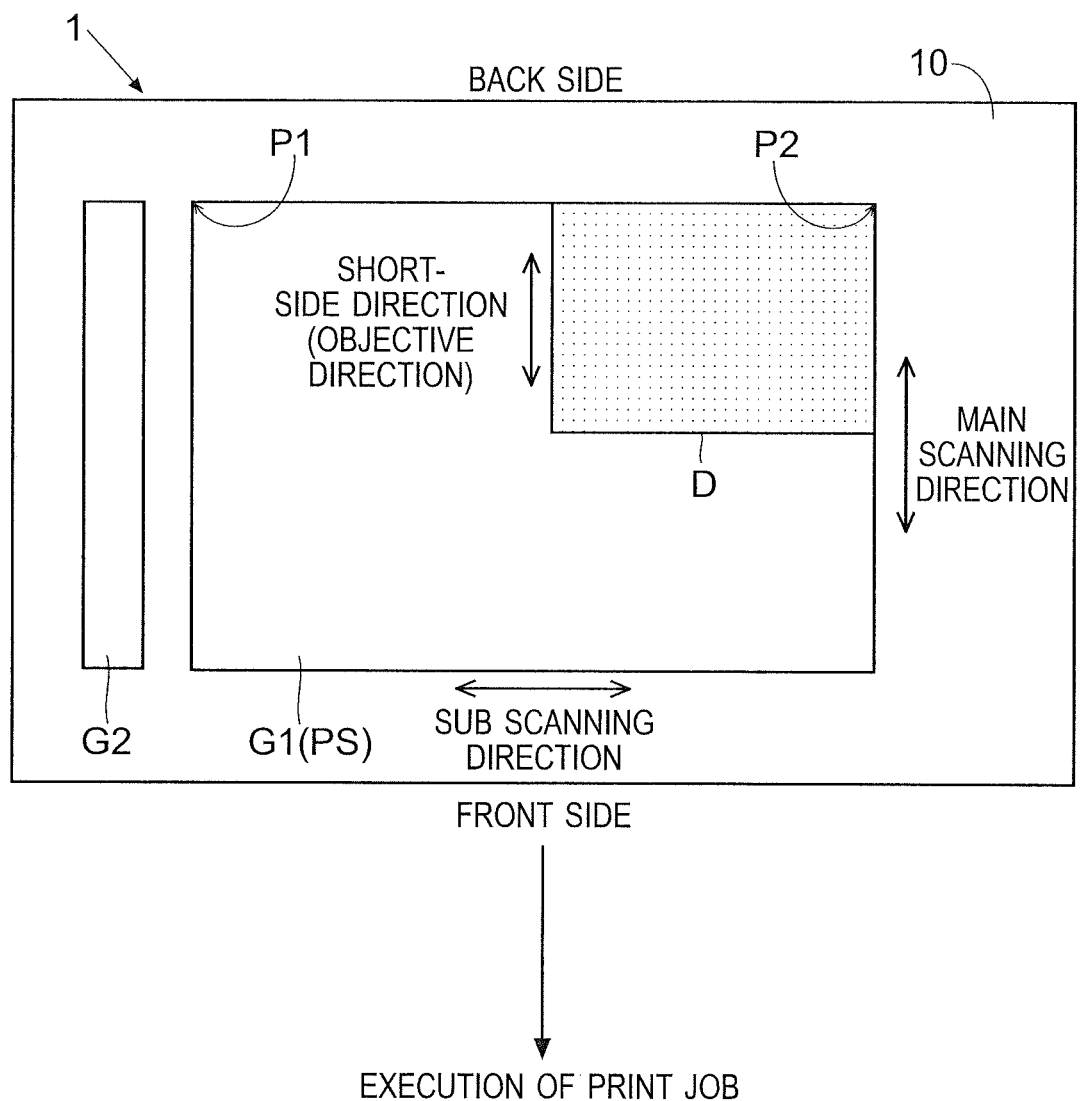
FIG. 13 is a view for explaining a job to be executed in one case where the document placed on the document placement surface of the multifunction peripheral according to one embodiment of the disclosure has its short-side direction (objective direction) oriented along a main scanning direction.

For example, as shown in FIG. 13, it is assumed that the document D is placed on the document placement surface PS such that the widthwise direction of the document D is along the main scanning direction, in which state the document D has been read by the image reading section 1. It is also assumed that a corner of the document D is set coincident with the second alignment position P2. In this case, the control section 4 decides that the objective direction is along the main scanning direction. Accordingly, the print job is executed.

Figure 14:
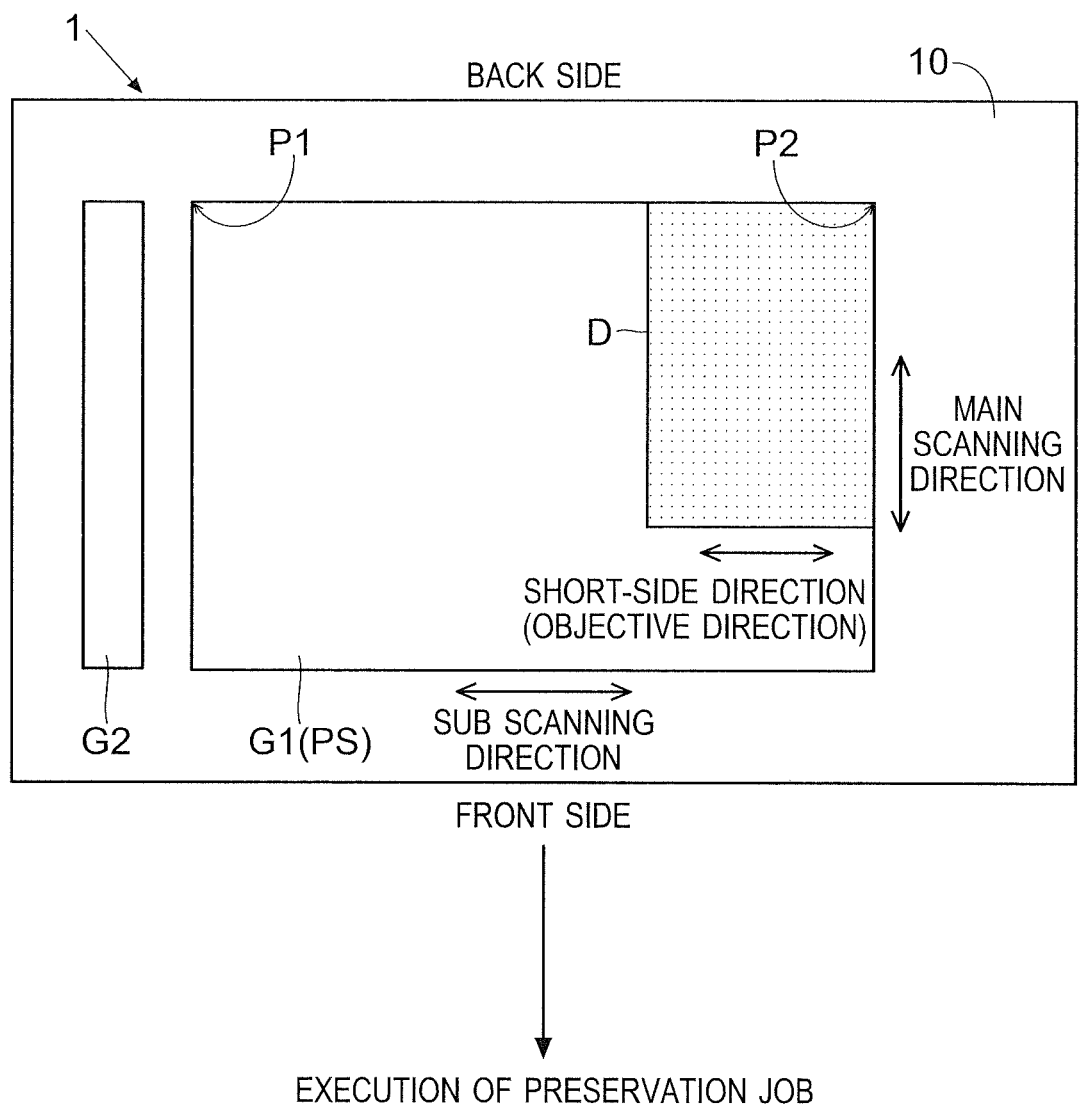
FIG. 14 is a view for explaining a job to be executed in another case where the document placed on the document placement surface of the multifunction peripheral according to one embodiment of the disclosure has its short-side direction (objective direction) oriented along a sub scanning direction.

On the other hand, as shown in FIG. 14, it is assumed that the document D is placed on the document placement surface PS such that the widthwise direction of the document D is along the sub scanning direction, in which state the document D has been read by the image reading section 1. It is also assumed that a corner of the document D is set coincident with the second alignment position P2. In this case, the control section 4 decides that the objective direction is along the sub scanning direction. Accordingly, the preservation job is executed.

With this configuration, the user is allowed to select an execution job only by changing the orientation of the document D placed on the document placement surface PS, hence improvement in user's convenience.

As yet another modification, the control section 4 decides whether or not a predetermined reset condition has been satisfied since execution of the handwritten-image erasing process for image data of the document D obtained by placement-and-reading process. For example, when a predetermined reset operation is performed on the operation panel 3, the control section 4 decides that the reset condition has been satisfied. Then, the control section 4 executes the handwritten-image erasing process also for image data of the document D obtained by conveyance-and-reading process since the execution of the handwritten-image erasing process for the image data of the document D obtained by the placement-and-reading process until the reset condition is satisfied.

With this configuration, when it is desired to acquire a plurality of pieces of erasing-processed image data corresponding to a plurality of document sheets D, respectively, indeed the document conveyance unit 101 needs to be opened and closed for the first-sheet document D so as to allow the document D to be placed on the document placement surface PS, but for the second and following document sheets D, the need is only to set the document sheets D on the document conveyance unit 101. Thus, the user's convenience is improved.

The embodiment disclosed herein should be construed as not being limitative but being an exemplification at all points. The scope of the disclosure is defined not by the above description of the embodiment but by the appended claims, including all changes and modifications equivalent in sense and range to the claims.

What is claimed is:

1. An image forming apparatus comprising:
an image reading section for reading a document placed on a contact glass to generate image data; and
a control section for deciding whether or not the document is present at a specified position of the contact glass, and in response to deciding that the document is present at the specified position, executing a handwritten-image erasing, process of erasing handwritten images from the image data of the document read by the image reading section; wherein
one of corner positions present on one end side of a sub scanning direction out of four corner positions of a document placement surface of the contact glass is set as a normal alignment position with which a corner of the document is to be coincident during reading process involving no handwritten-image erasing process,
a corner position opposed to the normal alignment position in the sub scanning, direction out of the four corner positions is set as the specified position, and
before reading of the document by the image reading section, the control section instructs the image reading section to execute a prescan process of reading an area of the contact glass on the one end side of the sub scanning direction and, based on image data obtained by the prescan process, the control section decides whether or not the document is present at the normal alignment position, where upon deciding that the document is present at the specified position and moreover deciding that the document is absent at the normal alignment position, the control section executes the handwritten-image erasing process.

2. The image forming apparatus according to claim 1, wherein upon deciding that the document is absent at the specified position, the control section suppresses the handwritten-image erasing process.

3. The image forming apparatus according to claim 1, further comprising a document detection part for varying its output value in response to presence or absence of the document at the specified position, wherein based on an output value of the document detection part, the control section decides whether or not the document is present at the specified position.

4. The image forming apparatus according to claim 1, wherein the control section executes an orientation discriminating process of recognizing an orientation of characters present in the image data of the document read by the image reading section to discriminate a recognized character orientation as an orientation of the document placed on the contact glass and, even with the document present at the specified position, the control section suppresses the handwritten-image erasing process unless the orientation of the document discriminated by the orientation discriminating process is a specified orientation.

5. The image forming apparatus according to claim 1, further comprising:

a printing section for executing a print job of printing, on a paper sheet, images based on image data; and a storage section for executing a preservation job of preserving image data, wherein when having executed the handwritten-image erasing process, the control section recognizes, as an objective direction, either one of a long-side direction or a short-side direction of image data that has been subjected to the handwritten-image erasing process, where when the objective direction is a direction along a main scanning direction, the control section executes a process for executing one of the print job and the preservation job and, when the objective direction is a direction along a sub scanning direction, the control section executes a process for executing the other of the print job and the preservation job.

6. The image forming apparatus according to claim 1, wherein the image reading section includes a document conveyance unit for conveying the document and is enabled to execute a conveyance-and-reading process of reading the document that is being conveyed by the document conveyance unit, and the control section executes the handwritten-image erasing process also for image data of the document obtained by the conveyance-and-reading process until a predetermined reset condition is satisfied since execution of the handwritten-image erasing process.

* * * * *